(12) United States Patent
Bursik et al.

(10) Patent No.: US 11,675,814 B2
(45) Date of Patent: Jun. 13, 2023

(54) AD HOC DATA EXPLORATION TOOL

(71) Applicant: Target Brands, Inc., Minneapolis, MN (US)

(72) Inventors: Jeffrey Jacob Bursik, Farmington, MN (US); Debashis Ghosh, Minneapolis, MN (US); Matt Jesser, Minneapolis, MN (US); Robert James Koste, Brooklyn Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 127 days.

(21) Appl. No.: 16/988,243

(22) Filed: Aug. 7, 2020

(65) Prior Publication Data
US 2022/0043833 A1    Feb. 10, 2022

(51) Int. Cl.
*G06F 16/28* (2019.01)
*G06F 16/2458* (2019.01)
*G06F 16/248* (2019.01)
*G06F 16/26* (2019.01)
*G06F 16/2457* (2019.01)
*G06F 16/2453* (2019.01)

(52) U.S. Cl.
CPC .......... *G06F 16/283* (2019.01); *G06F 16/248* (2019.01); *G06F 16/2465* (2019.01); *G06F 16/24539* (2019.01); *G06F 16/24573* (2019.01); *G06F 16/26* (2019.01)

(58) Field of Classification Search
CPC ............. G06F 16/283; G06F 16/24573; G06F 16/24539; G06F 16/26; G06F 16/2465; G06F 16/248; G06F 3/04842; G06F 3/04847; G06F 16/2228; G06F 3/0482; G06F 16/252; G06F 16/245; G06F 16/9038; G06F 16/9535; G06F 3/0481; G06F 16/538; G06F 16/54; G06F 16/904; G06F 16/338
See application file for complete search history.

(56) References Cited

U.S. PATENT DOCUMENTS

| | | | |
|---|---|---|---|
| 6,704,726 B1 | 3/2004 | Amouroux | |
| 8,214,747 B1 * | 7/2012 | Yankovich | ............ G06F 9/4451 715/810 |
| 9,633,076 B1 | 4/2017 | Morton et al. | |
| 10,255,699 B2 | 4/2019 | George et al. | |

(Continued)

OTHER PUBLICATIONS

Alteryx1.

(Continued)

*Primary Examiner* — Yuk Ting Choi
(74) *Attorney, Agent, or Firm* — Merchant & Gould P.C.

(57) ABSTRACT

The disclosed application relates to a tool by which a user may create a cloud workspace that includes a data memory space, as well as a tool for automatically identifying ad-hoc analyses on that data. The solution allows a user to connect to data sources using SQL or GUI tools, combine data from different data sources, prepare and clean the data, mine the data for insights, and move that data into downstream reporting tools for visualization. The system is linked to a code repository to allow data scientists to execute code from the code repository in trial data spaces, investigate that data, and prepare more in-depth analytics for downstream reporting tools.

17 Claims, 7 Drawing Sheets

(56) References Cited

U.S. PATENT DOCUMENTS

| | | | | |
|---|---|---|---|---|
| 11,106,734 | B1* | 8/2021 | Batsakis | G06F 3/0652 |
| | | | | 707/737 |
| 2003/0009295 | A1* | 1/2003 | Markowitz | G16B 25/10 |
| | | | | 702/20 |
| 2014/0013297 | A1* | 1/2014 | Cook | G06F 8/73 |
| | | | | 717/105 |
| 2015/0379429 | A1* | 12/2015 | Lee | G06N 20/00 |
| | | | | 706/11 |
| 2017/0031986 | A1* | 2/2017 | Li | G06F 16/24542 |
| | | | | 717/105 |
| 2018/0329990 | A1* | 11/2018 | Severn | G06F 16/355 |
| | | | | 717/105 |
| 2019/0095478 | A1* | 3/2019 | Tankersley | G06F 16/2379 |
| | | | | 717/105 |

OTHER PUBLICATIONS

Alteryx2—"Alteryx Designer—Experience the Thrill of Solving", https://www.alteryx.com; 7 Pages, 2020.

Alteryx3—"Alteryx Server—Analytics at Scale", https://www.alteryx.com; 6 Pages, 2020.

Alteryx4—"Alteryx Connect—Find All Your data", https://www.alteryx.com; 6 Pages, 2020.

Alteryx5—"Alteryx—Advanced Analytics"—https://www.alteryx.com; 4 Pages, 2020.

Chartio1—Where Teams Explore Data "Create powerful dashboards from your company's data and quickly discover insights with Chartio", https://chartio.com, 10 Pages, Printed Mar. 2, 2020.

Chartio2—Software Advice "What can we help you find?", https://www.softwareadvice.com/bi/chartio-profile/, 6 Pages, Printed Mar. 2, 2020.

Chartio3—"Our Mission: make data accessible to anyone", https://chartio.com/product/, 9 Pages, Printed Mar. 2, 2020.

Chartio4—"Cloud Based Data Exploration, Charts and Interactive Dashboards—Martech Zone", https://martech.zone/chartio-dashboards/, 5 Pages, Printed Mar. 2, 2020.

Talia, Domenico et al., "Data Analysis in the Cloud—1st Edition—Models, Techniques and Applications", https://www.elsevier.com, 9 Pages, 2016.

Haas, Laura M. et al., Optimizing Queries across Diverse Data Sources, IBM Almaden Research Center, San Jose, California, 10 Pages, 1997.

Gaekwad, Nikhil, "Microsoft Power BI Blog—Announcing Dashboard Comments in Power BI: Your new hub to discuss data and collaborate with others", https://powerbi.microsoft.com; 21 Pages, Printed Mar. 2, 2020.

The Power BI Team (Microsoft), "Microsoft Power BI Blog—Sharing and Discovering Queries Using Power Query and Power BI", https://powerbi.microsoft.com; 13 Pages, Printed Mar. 2, 2020.

Tableau (Products)—"Data Everywhere—Tableau for everyone—Designed for the individual Scaled for the enterprise", https://www.tableau.com, 11 Pages, Printed Mar. 2, 2020.

Tableau—"What is Tableau? Uses and Applications", https://tableau.com, 10 Pages, 2020.

Tableau—"Industry-leading analytics for your customers", https//www.tableau.com/embedded-analytics, 13 Pages—Printed Mar. 2, 2020.

\* cited by examiner

Receiving a database query from a user
402

↓

Storing records received in response to the database query in a containerized temporary storage space
404

↓

Displaying the records received in a results pane
406

↓

Receiving a selection of an available dimension
408

AD HOC DATA EXPLORATION TOOL

BACKGROUND

Data scientists need to be able to obtain and perform investigations on data across any of a number of different data sources, using any of a number of otherwise undefined data relationships to detect previously-undetected relationships among data in an organization. However, other users (e.g., business analysts) often are required to review similar datasets for trend information (e.g., item sales trends, revenue trends, business condition trends, etc.). The types of analysis performed by these two groups is significantly different in terms of need. Business analysts will require the convenience of graphical analysis and graphical assistance in connecting to underlying databases, while data scientists will need the ability to easily access data and apply data science models (e.g., executing Python and/or R scripts on that data directly).

Currently, enterprise databases are ill-constructed to accomplish in-place analysis for both groups. Such databases, which may be constructed as SQL databases or distributed databases (e.g., in Hadoop), either require significant resources to gather data from a plurality of different nodes (in the case of distributed databases) or to merge particular tables that otherwise represent unrelated data. It takes a significant amount of computing resources, and/or user time to clean and organize data into something useable for analysis. Often end users do not wish to perform data analytics using enterprise-wide data when the effectiveness or direction of analysis remains unknown.

Accordingly, these different user groups will use a variety of different existing analysis tools. Data scientists will often generate interim data collections and execute analytic code against that data. Business analysts will use analysis tools to generate dashboards and/or reports; those tools allow end users to statically define connections to underlying data and define visualizations on that data based on available dimensions defined in the underlying data (e.g., existing data relationships), but are constrained as to the flexibility of analysis.

While such tools have proven valuable in generating graphical data analyses that may be used by an organization, they are often inconvenient for rapid assessment of enterprise data in an analysis setting, and exchange of data among data scientists and business analysts. Accordingly, improvements in flexibility of analysis are desirable.

SUMMARY

Generally, the present disclosure includes technology for exploring and mining data within a large organization.

In one embodiment, a data exploration tool is disclosed. The data exploration tool comprises: a data exploration interface including a query pane and a results pane, the query pane configured to receive a database query directed to a plurality of different underlying data sources, the results pane illustrating records returned from the plurality of different underlying data sources in response to the database query received from a user in the query pane; a containerized temporary storage space into which query results from the database queries are stored; and an analysis interface including a dimension selection panel configured to display each of the available dimensions included in the query results, each of the dimensions being selectable to be applied within a scorecard as one of (1) a data column or (2) a data filter.

In a second embodiment, a method of analyzing enterprise data is disclosed. The method comprises: receiving a database query from a user in a query pane of a data exploration interface of a data exploration tool, the database query being a query of a plurality of different underlying data sources; storing records received in response to the database query in a containerized temporary storage space; displaying the records received in response to the database query in a results pane of the data exploration interface; and receiving, in an analysis interface, a selection of an available dimension presented in a dimension selection panel to be included within a scorecard as one of (1) a data column or (2) a data filter.

In a third embodiment, a data exploration environment is disclosed. The data exploration environment comprises: a code repository; a data exploration tool instantiable within a cloud-based container, the data exploration tool being communicatively linked to the code repository such that a temporary storage space within the cloud-based container is accessible to code executable from the code repository, the data exploration tool further comprising: a data exploration interface including a query pane and a results pane, the query pane configured to receive a database query directed to a plurality of different underlying data sources, the results pane illustrating records returned from the plurality of different underlying data sources in response to the database query received from a user in the query pane; an analysis interface including a dimension selection panel configured to display each of the available dimensions included in the query results, each of the dimensions being selectable to be applied within a scorecard as one of (1) a data column or (2) a data filter.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the subject matter of this disclosure relates to a data exploration tool. Entities that handle large amounts of data need to be able to 1) access data, 2) blend, prepare, and clean data, 3) mine and analyze data for insights, 4) automate key parts of the data movement & reporting tasks, and 5) ultimately visualize/report on your data. Currently, there are a wide range of tools in the market to achieve these activities. However, they are disparate, often complicated and are disconnected from each other. For example, entities may use data storage platforms to store data, data movement platforms to move data in and out of the data storage platform and a visualization/reporting layer to create visual representations of the data. However, a tool to analyze and manipulate the data set within the data science workflow is currently lacking.

The disclosed application relates to a tool by which a user may create a cloud workspace via a Docker container that includes a data memory space, as well as a tool for automatically identifying ad-hoc analyses on the data. The disclosed solution allows a user to connect to data sources using SQL or GUI tools, combine data from multiple different data sources, prepare and clean the data, explore and mine the data for insights, and move the data into downstream reporting tools for visualization. The disclosed system may be linked to a GitHub repository to allow data scientists to execute code from GitHub in trial data spaces, investigate the data, and prepare in-depth analytics for downstream reporting tools.

Figure 1:
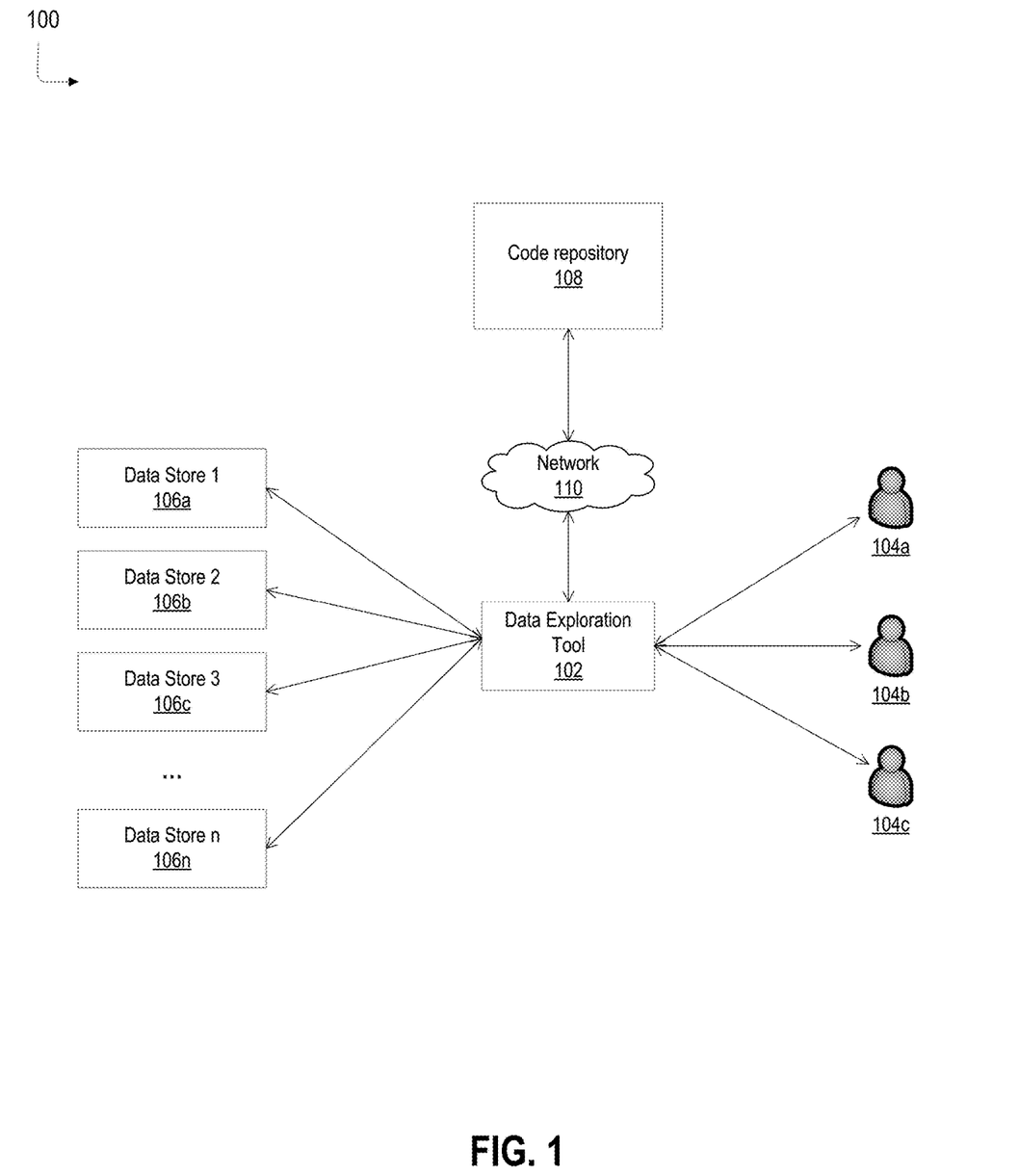
FIG. 1 illustrates an example enterprise environment 100 for the disclosed data exploration solution.

FIG. 1 illustrates an example enterprise environment 100 for the disclosed data exploration solution. The data exploration enterprise environment includes a data exploration tool 102. In some examples, the data exploration tool 102 can be instantiated within a cloud container.

The data exploration tool 102 may include a user interface that can be accessed by one or more end users 104 (104a, 104b, 104c, etc.). The end users may include business analysts and data scientists among others. In some examples, the needs of the different types of end users 104 may vary and the data exploration tool 102 may be configured to meet the different needs of the end users 104. For example, data scientists may need to obtain and perform in-depth investigations on heterogeneous datasets stored in heterogeneous data stores in order to detect relationships among data that is scattered across different departments within an organization. On the other hand, business analysists may require simply to review datasets for trends and create visual representations of the datasets. Therefore, the business analysts may require a simple interface with emphasis on graphical assistance in connecting to underlying datastores and obtaining the required data. The data exploration tool 102 may meet the needs of both types of end users 104 as explained in further detail in relation to FIG. 2.

In some examples, the data exploration tool 102 is communicatively connected to one or more data stores 106 (including 106a, 106b, 106c . . . 106n). The data stores 106 may be heterogeneous databases storing disparate heterogeneous data. In some examples, the plurality of data stores 106 may be maintained by different departments within an organization to store data. In some examples, the data exploration tool 102 may access the plurality of heterogeneous data stores 106 through a network connection to retrieve data related to a user query as described in further detail in relation to FIG. 2.

In some examples, the data exploration tool 102 may be communicatively connected to a code repository 108 over a network 110. The network 110 is an electronic communication medium that facilitates communication between multiple different devices. The network 110 can include links between multiple computing devices and can include a variety of different kinds of hardware (e.g., routers, hubs, servers, etc.) or software to connect the devices. The network 110 can vary in scope and configuration. In some examples, the network 104 is a local area network, a wide area network (e.g. the Internet), or an intranet, among others.

The code repository 108 may be a web-based platform for managing source code for a plurality of code developers. For example, code developers may use code repository 108 to retrieve, modify, check-in, store and execute scripts. In the disclosed example, the code repository 108 may be used to manage scripts related to retrieval, analysis and presentation of data and is described in further detail in relation to FIG. 2.

Figure 2:
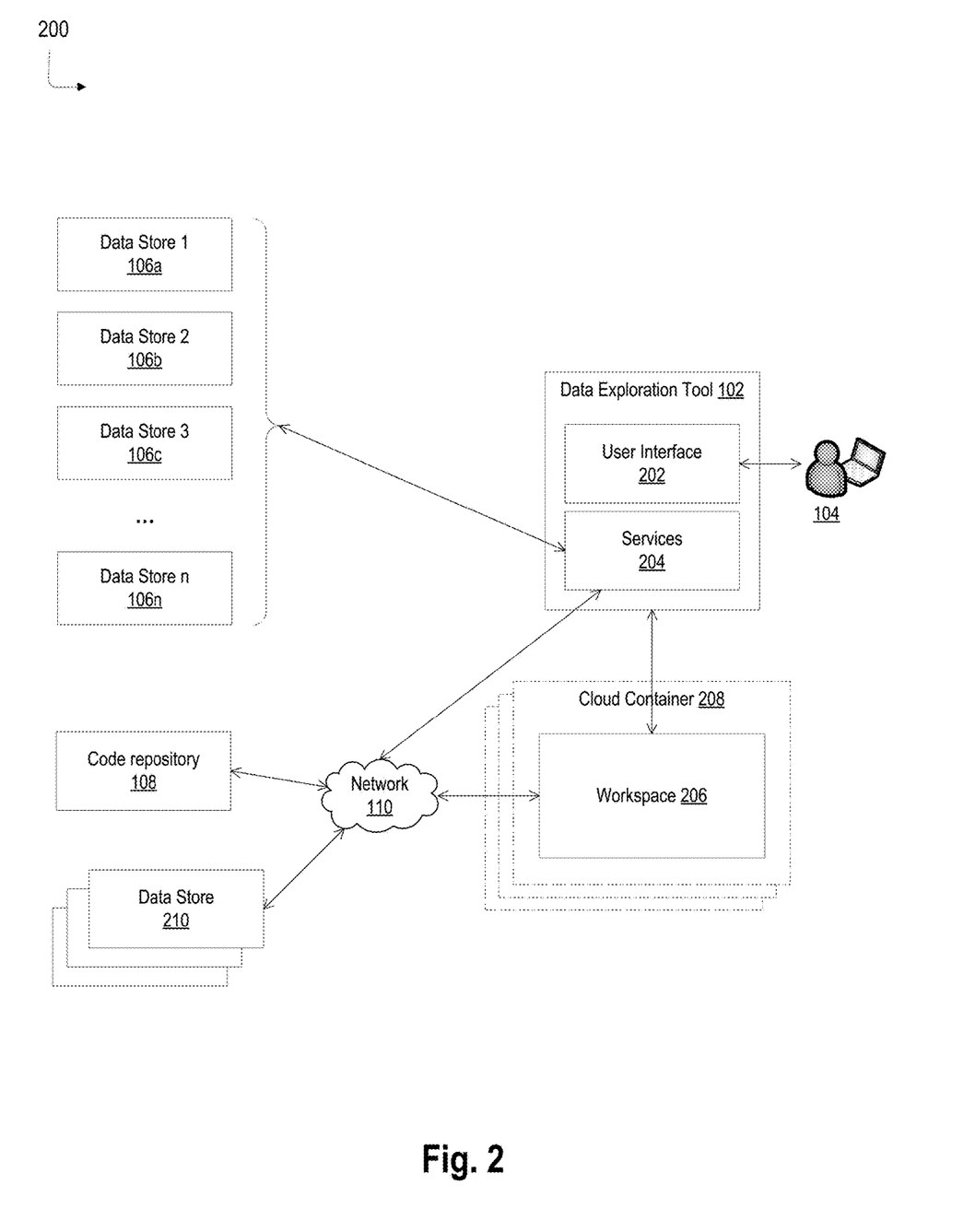
FIG. 2 illustrates an example architecture 200 of the data exploration enterprise.

FIG. 2 illustrates an example architecture 200 of the data exploration enterprise. Some examples of the architecture 200 includes the data exploration tool 102 communicatively connected to a plurality of heterogeneous data stores 106 as described in relation to FIG. 1. The data exploration tool 102 includes a user interface 202 that an end user 104 can access when using the data exploration tool 102. The user interface 202 of the data exploration tool 102 may include a query pane and a results pane. The query pane is configured to receive a query related to data exploration or analysis from the end user 104. Once a query is received from the end user 104, the data associated with the query is retrieved from the one or more data stores 106 and returned back to be temporarily stored and analyzed using the data exploration tool 102. In some examples, the results pane from the user interface 202 is used to illustrate records returned from the plurality of heterogeneous data sources 106 in response to the databased query received from the end user 104. The user interface 202 of the data exploration tool 102 is further described in relation to FIGS. 5-7.

In some examples, the data exploration tool 102 also includes one or more service 202 that are configured with the process of retrieving and analyzing the data related to the user query. In some examples, the services 204 may include a query manager for managing the retrieval of data from the heterogenous data sources 106. Other examples of services that may be used by the data exploration tool 102 may include a data processing and normalization service, an authentication service, a monitoring service, a containerization service, etc. among other data analysis and processing services.

For example, when an end user submits a data query through the user interface 202, the data exploration tool 102 may use a query manager service to retrieve data from the plurality of data stores 106. An authentication service may be used to authenticate the user credentials and access rights before retrieving the queried data. In some examples, the retrieved data can be from different databases and can be formatted differently. Before the retrieved data is stored and presented to the user, the data can be normalized into a single format for easier analysis. For example, a data processing and normalization service can be used to normalize the retrieved data. A monitoring service may also monitor the queries and collect and store meta data and log files related to the queries, which can then be used during data analysis. The services 204 that are used in the retrieval and processing of data may be customized according to the needs of the organization or may include currently-available services such as Logstash, Apache Airflow, Docker, Jupyter, Slack etc.

Upon retrieving the data related to the end user's 104 query from the plurality of data stores 106, the retrieved data may be temporarily stored in a data store 210 that is communicatively connected to the data exploration tool 102. In some examples, the data store 201 may include a containerized database-as-service solution (DBaaS) that allows the data related to the user query to temporarily be stored for faster and easier access, without having to periodically retrieve data from the plurality of data stores 106 each time the data is used. The containerized DBaaS typically runs on a cloud computing platform and access to the database is provided as a service. The DBaaS model provides a scalable, easily accessible and low-cost solution such that application owners need not install, manage and maintain the database themselves. Other solutions of how the data store 210 are configured are also possible.

In some examples the data exploration tool 102 may create a containerized workspace 206 to share, analyze, and process the data retrieved in response to the user query. For example, when a user query is received, a service 204 such as Docker can be used to create a cloud container space 208 to allow users to explore the retrieved data. The cloud container space 208 may include a workspace 206, within it where the user may interact with the retrieved data. The containerized workspace solution allows for a plurality of users to interact with the retrieved data without having to re-write queries each time. In some examples, each query may result in a new containerized workspace 206 to be created with the help of a tool such as Docker. In other examples, separate workspaces 206, each workspace within a cloud container 208, may be created based on the underlying data or user.

In some examples, each containerized workspace 206 may include an SQL client and a Jupyter Notebook. The workspace 206 may be communicatively connected to the code repository 108 and the data store 210 via a network 110. The SQL client may be used to retrieve the query data that was retrieved and temporarily stored within the data store 210. The Jupyter notebook may be a web-based interactive development environment for the user to analyze, explore, generate insights and blend the query data using a plurality of scripts from the code repository 108. The analyzed data may be displayed using visualization tools that are configured as part of the services 204.

In some examples, upon receiving a query from the end user 104 through the user interface 202, the data exploration tool 102 may retrieve the underlying data for the query from the plurality of data sources 106. The retrieved data is processed and normalized with assistance from one or more services 204 and temporarily stored in the data store 210 for easy and quick access. The retrieved data is also displayed on the workspace, which is viewable and accessible by the end user 104 through the user interface 202. The end user 104 may use a Jupyter notebook space within the workspace 206 to analyze, edit, blend, explore, mine and process the query data that is retrieved from the data store 210 as needed. The end user 104 may also access, retrieve and execute a plurality of scripts that are stored in the code repository 108 on the query data that is retrieved from the temporary data store 210. Although the disclosed example discloses using a Jupyter notebook, any other development environment may be used to analyze the data. The end user 104 may use one or more visualization tools to display the analyzed data in a visual format on the user interface 202.

In some examples, the end user 104 may share the workspace, including the query data as well as the scripts used to analyze the data with other users, allowing users to collaborate in developing data insights as a team. For example, an instant messaging service may also be integrated with the data exploration tool to communicate messages regarding the query data with other users on a real-time basis.

Figure 3:
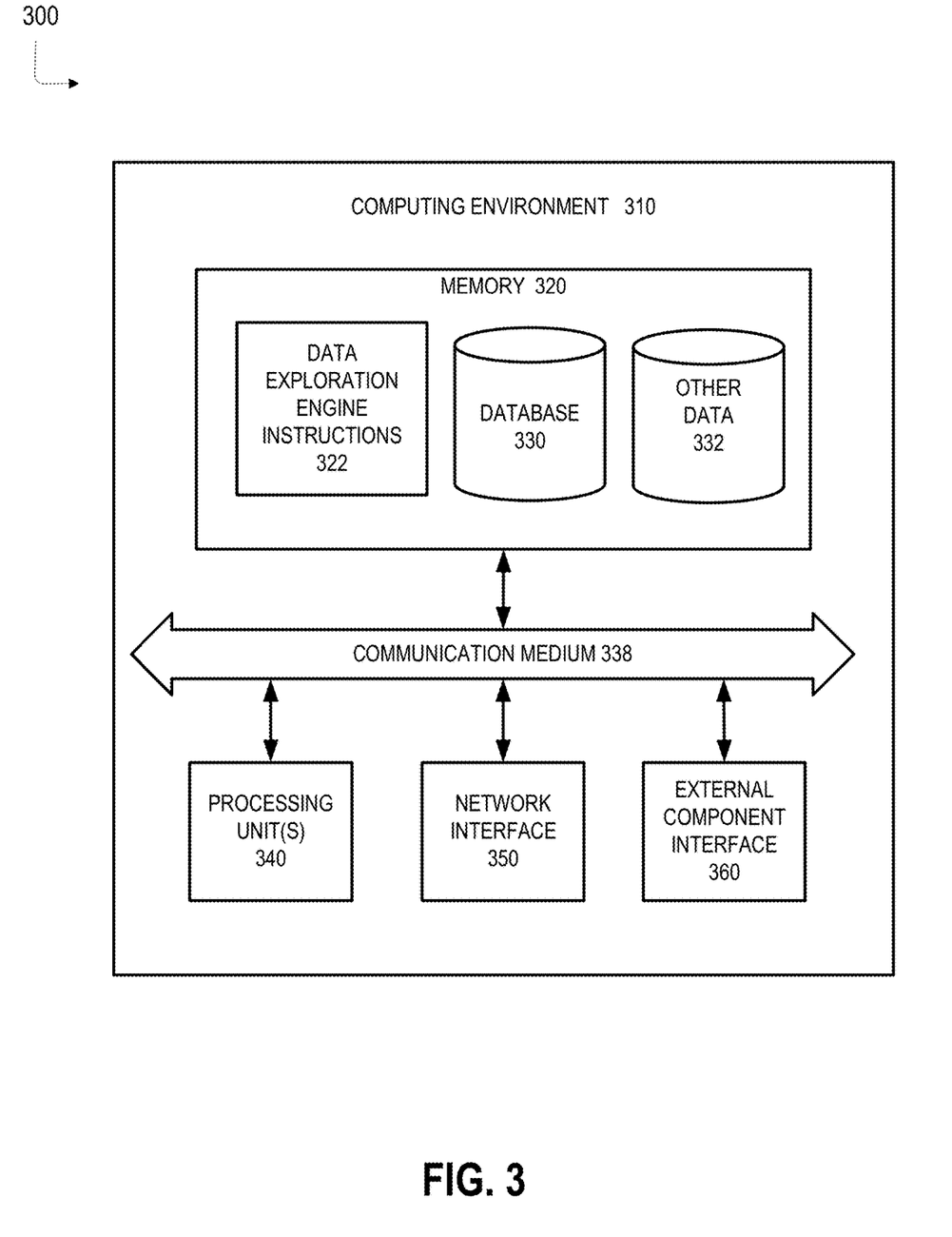
FIG. 3 illustrates an example system 300 with which disclosed systems and methods can be used.

FIG. 3 illustrates an example system 300 with which disclosed systems and methods can be used. In an example, the data exploration tool enterprise 100 as one or more systems 300 or one or more systems having one or more components of systems 300. In an example, the system 300 can include a computing environment 310. The computing environment 310 can be a physical computing environment, a virtualized computing environment, or a combination thereof. The computing environment 310 can include memory 320, a communication medium 338, one or more processing units 340, a network interface 350, and an external component interface 360.

The memory 320 can include a computer readable storage medium. The computer storage medium can be a device or article of manufacture that stores data and/or computer-executable instructions. The memory 320 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 320 can store various types of data and software. For example, as illustrated, the memory 320 includes data exploration engine instructions 322 for implementing one or more aspects of the data exploration enterprise 100 described herein (e.g., as described in relation to FIGS. 1-2), database 330 (e.g., as described in relation to database 106 of FIG. 1), as well as other data 332.

The communication medium 338 can facilitate communication among the components of the computing environment 310. In an example, the communication medium 338 can facilitate communication among the memory 320, the one or more processing units 340, the network interface 350, and the external component interface 360. The communications medium 338 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 340 can include physical or virtual units that selectively execute software instructions. In an example, the one or more processing units 340 can be physical products comprising one or more integrated circuits. The one or more processing units 340 can be implemented as one or more processing cores. In another example, one or more processing units 340 are implemented as one or more separate microprocessors. In yet another example embodiment, the one or more processing units 340 can include an application-specific integrated circuit (ASIC) that provides specific functionality. In yet another example, the one or more processing units 340 provide specific functionality by using an ASIC and by executing computer-executable instructions.

The network interface 350 enables the computing environment 310 to send and receive data from a communication network (e.g., network 110). The network interface 350 can be implemented as an Ethernet interface, a token-ring network interface, a fiber optic network interface, a wireless network interface (e.g., WI-FI), or another type of network interface.

The external component interface 360 enables the computing environment 310 to communicate with external devices. For example, the external component interface 360 can be a USB interface, Thunderbolt interface, a Lightning interface, a serial port interface, a parallel port interface, a PS/2 interface, and/or another type of interface that enables the computing environment 310 to communicate with external devices. In various embodiments, the external component interface 360 enables the computing environment 310 to communicate with various external components, such as external storage devices, input devices, speakers, modems, media player docks, other computing devices, scanners, digital cameras, and fingerprint readers.

Although illustrated as being components of a single computing environment 310, the components of the computing environment 310 can be spread across multiple computing environments 310. For example, one or more of instructions or data stored on the memory 320 may be stored partially or entirely in a separate computing environment 310 that is accessed over a network.

Figure 4:
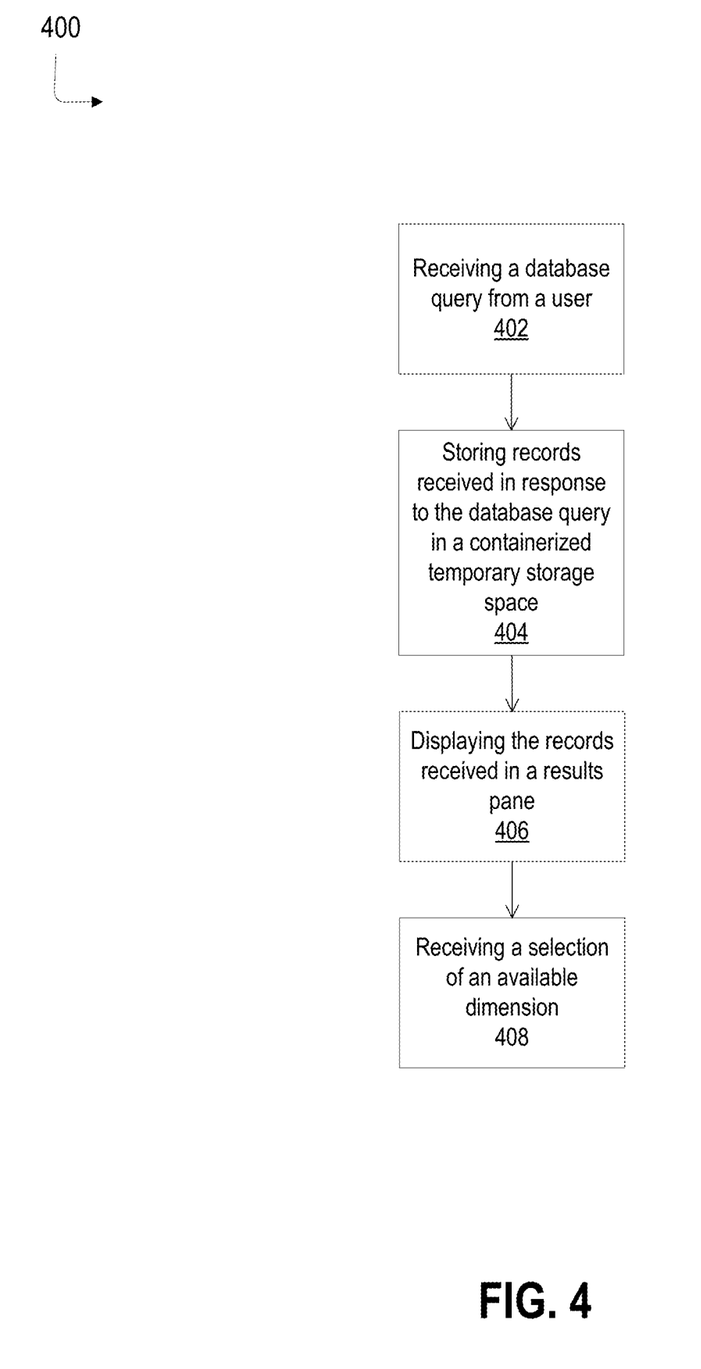
FIG. 4 illustrates an example process 400 of analyzing enterprise data.

FIG. 4 illustrates an example process 400 of analyzing enterprise data. In some embodiments, in operation 402, the data exploration tool 102 may receive a database query from an end user 104. The user may submit the query through a query pane on a user interface 202 of the data exploration tool 102. The database query submitted by the end user 104 may be associated with retrieving data from a plurality of different underlying data sources 106.

In an example operation 404, the data received from one or more data stores 106 in response to the database query is stored in a temporary data store 210. The temporary data store may be within a cloud container. In some examples, the data store 210 may be a database as a service (DBaaS) solution, which minimizes the management and maintenance costs related to the data store 210. Storing the data in a containerized data store 210 allows for quick and easy access to the relevant data while performing analysis on the retrieved data.

In example operation 406, the data retrieved as a response to the database query and stored in a containerized temporary data store 210, is displayed in a results pane of the user interface 202 of the data exploration tool 102. Displaying the records related to the database query on the user interface 202 allows the end user 104 to access and interact with the data and perform additional operations on the data.

In example operation 408, the records from the database query is received in an analysis interface on the user interface 202. The received records may be presented to the user on a scorecard or dashboard. A scorecard may be a summarized view of the organization's performance and may be used by organizations to measure various performance metrics and easily identify areas of the organization that needs improvement. A dimension selection panel within the analysis interface allows users to select portions of the records to be presented on a scorecard. For example, the dimension selection panel may be used to select portions of the retrieved records to be included within available dimensions on the score card. In some examples, the portions of the records may be presented as data columns on the scorecard. In other examples, portions of the records may be used as data filters. Other examples are also possible.

Figure 5:
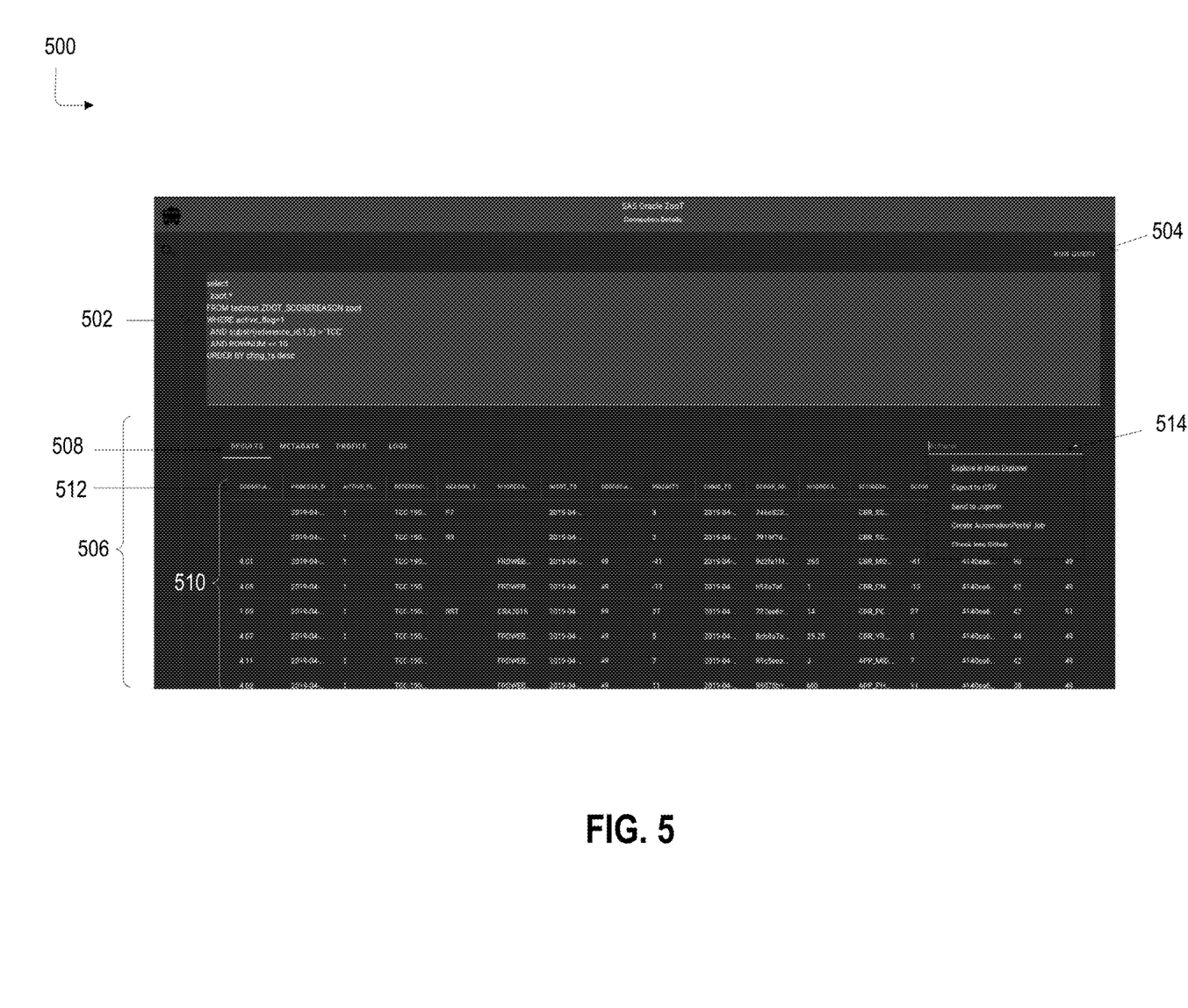
FIG. 5 illustrates an example user interface 500 of the data exploration tool.

FIG. 5 illustrates an example user interface 500 of the data exploration tool. The example user interface 500 illustrates a query pane 502 where the user 104 may enter a database query to retrieve data. Typically, a database query includes instructions to retrieve one or more records from one or more databases according to the criteria included in the query. Upon entering a database query, the user may select a "Run Query" option 504 adjacent to the query pane 502. In some examples, the "Run Query" option 504 may be a button that can be selected by the user by clicking on the button. Other ways of presenting a "Run Query" option to user are also possible.

Upon a user 104 entering a database query within the query pane 502 and selecting the "Run Query" option 504, the data exploration tool executes the database query. In some examples, executing a database query includes retrieving records from one or more databases 106 as specified in the query. The resulting records that are retrieved in response to the execution of the database query can be illustrated on a results pane 506 of the data exploration tool 102.

The results pane 506 may include different tabs or pages 508 to display different types of information related to the database query. In some examples, the tabs or pages 508 include a "Results" tab or subpage, a "Metadata" tab or subpage, a "Profile" tab or subpage and a "Logs" tab or subpage. Each of the tabs and subpage may be viewed by the user by clicking on the tab or subpage name. Other types of tabs or subpages 508 and other ways of accessing each of the tabs or subpages are also possible.

In some examples, selecting the "Results" tab may result in a display of the underlying records related to the database query. In some other examples, selecting the "Metadata" tab may result in a display of the metadata that is collected by a monitoring service configured within the services 204 and stored in the data store 210 each time a query is executed. Metadata related to a query may include data related to time taken to execute the query, date and time when the query was executed, the username of the user that executed the query, and other peripheral information related to the database query. In some examples, selecting the "Profile" tab may result in the display of the profile of the user executing the database query. In some other examples, selecting the "Logs" tab may result in the display of the logfiles related to the database query. Other types of tabs or pages 508 are also possible. Other data may also be collected and displayed upon the selection of one or more of the tabs and subpages 508.

In some examples, the resulting records retrieved in response to the database query may be displayed as a pivot table 510 under the "Results" tab. For example, the resulting records may be displayed as a pivot table 510 wherein the pivot table 510 includes columns of data with column headings 512 that describes the underlying data. Each column of data represents a dimension of data that can be further explored using an explorer pivot pane described further in relation to FIGS. 6 and 7. Other ways of displaying the resulting records is also possible Further, the results pane 506 may also include an option to select one or more "Actions" 514. In some examples, the "Actions" option 514 may be drop down menu that includes a plurality of options from which the user may select an action to execute. For example, the "Actions" option 514 may include the following actions: explore in data explorer, export to CSV, send to Jupyter, create automated portal job, and/or check into Github. Other "Action" options 514 are also possible.

Figure 6:
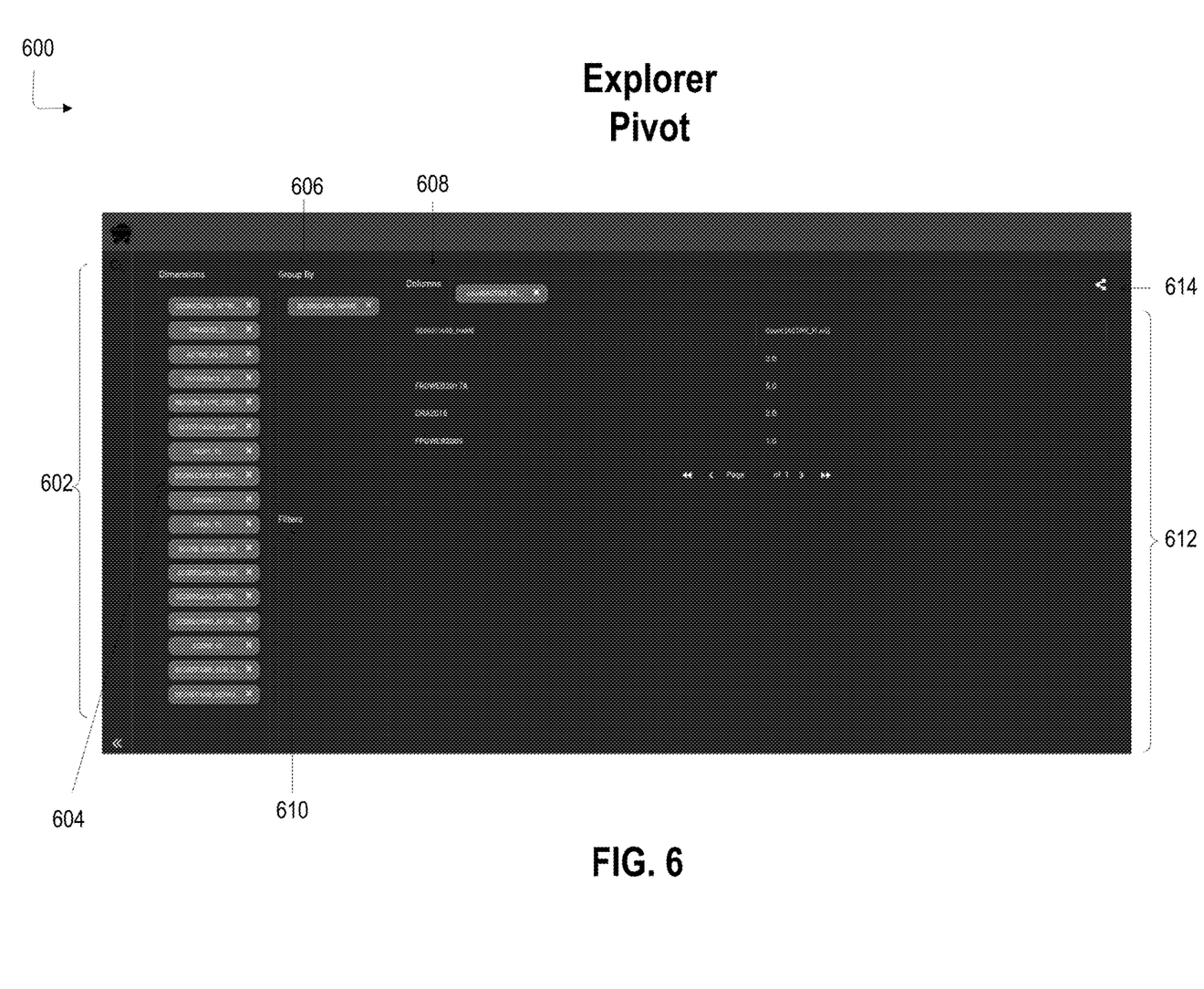
FIG. 6 illustrates another example user interface 600 of the data exploration tool.

FIG. 6 illustrates another example user interface 600 of the data exploration tool. The example user interface 600 illustrates an analysis interface, including a dimension selection pane 602, a group by pane 606, a columns pane 608, a filter pane 610 and a results pane 612. The analysis interface allows users 104 to explore the data retrieved as a result of the database query. For example, the retrieved data may be grouped together as dimensions of data based on different categories as represented in the pivot table 510 from FIG. 5.

In some examples, the analysis interface receives the available dimensions of data 604 and presents each dimension of data as a user selectable graphical element within the dimension selection panel 602. For example, in the disclosed user interface from FIG. 5, the pivot table 510 includes columns of data with column headings 512. Each one of the column headings is categorized as a dimension of data 604 and listed as a graphical element within the dimension selection panel 602 of the example user interface 600. The dimension pane 602 lists all available dimensions of data that can then be used by the user to explore and analyze the underlying data. The user 104 may select one or more available dimensions 604 from the dimension selection panel 602 and drag and drop the selected dimension(s) into other panes within the analysis user interface 600 to update what is viewed within the results pane 612. Other examples of how the user can interact with and select dimensions of data for analysis are also possible.

In some examples, the group by pane 606 allows the user to group and view the data that is associated with the dimensions included within the group by pane 606. The columns pane 608 allows for the user to add one or more additional dimensions of data to be viewed as additional columns of data that are also grouped together based on the dimensions included within the group by pane 606. The filters pane 610 may be used to filter the data displayed within the results pane 612 based on data type or value. The filter pane 610 is further described in relation to FIG. 7. The data retrieved based on the user's database query may be processed according to the user preferences from the group by pane 606, column pane 608 and filters pane 610 and displayed within the results pane 612. Other types of panes and other ways of processing the data are also possible.

For example, in FIG. 5, the third column of data and the sixth column of data from the left includes data related to ACTIVE_FLAG and SCORECARD_NAME respectively, as represented by the column headings 512 at the top of the columns. In the example analysis user interface 600, the dimension selection pane 600 may include ACTIVE_FLAG and SCORECARD_NAME as two of the dimensions of data 604. Upon the user selecting and dragging the SCORECARD_NAME dimension into the group by pane 606, the results pane 612 may be populated with data associated with the SCORECARD_NAME. Additionally, when the ACTIVE_FLAG dimension is selected and moved into the columns pane 608, the results pane 612 is updated with the data associated with the ACTIVE_FLAG as an additional column of data. In some examples, the user may apply additional functions to the data from the data column pane 608. In the disclosed example, the user has included a "count( )" function to the ACTIVE_FLAG data in the column pane 608. Other functions are also possible.

In some examples, the analysis use interface 600 may include a share option 614. Upon selecting the share option 614, the analysis user interface 600, as it appears at the time the share option 614 is selected, can be shared with one or more secondary users. For example, by using the share option on the analysis user interface 600, the user 104 need not separately share the database query information or the configurations of the dimensions pane, 602, the group by pane 606, the columns pane 608, or the filters pane 610 with the one or more secondary users in order for the one or more secondary users to recreate the analysis. In other words, the share option 614 allows users to share their analysis setup and the secondary users can immediately view, edit and contribute to the analysis without having to recreate the analysis or retrieve the same data.

Figure 7:
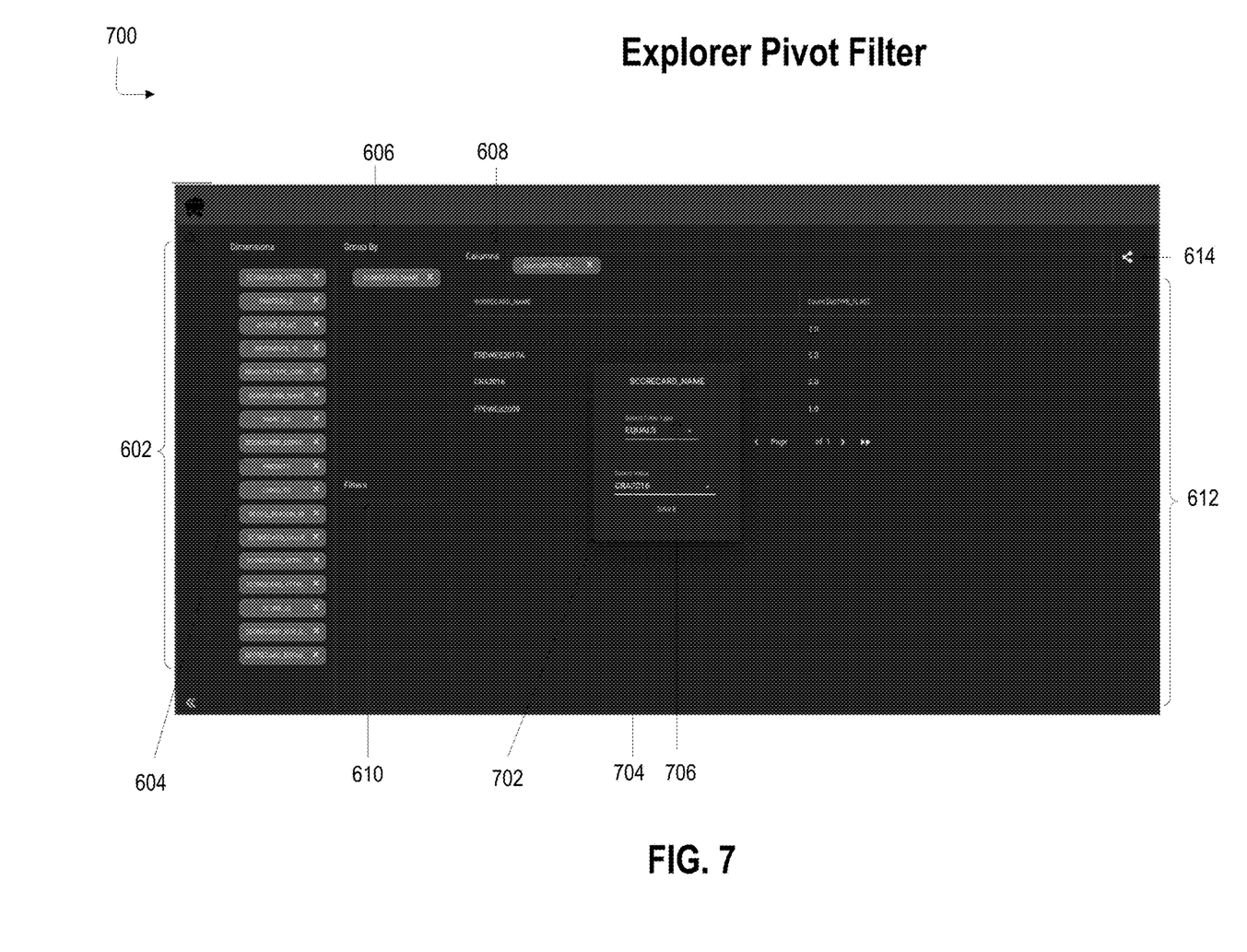
FIG. 7 illustrates an example user interface 700 of the data exploration tool.

FIG. 7 illustrates an example user interface 700 of the data exploration tool. The example user interface 700 illustrates the execution of the filter option from the filter pane 610 of the analysis user interface 600. As described in relation to FIG. 6, the filter pane allows the user to further analyze the retrieved data by executing one or more functions on the data that may be displayed on the results pane 612. In the disclosed example, the results pane is populated by two dimensions of data including the SCORECARD_NAME and the ACTIVE_FLAG. As seen in the results pane 612, the displayed dimensions are further grouped by the values of the SCORECARD_NAME and a count( ) function is applied to the ACTIVE_FLAG data. In the present example the filters pane 610 allows the user 104 to further process the data displayed within the results pane 612 using one or more functions. For example, selecting the filters pane 610 may open a separate window 702 with an option to select the filter type 704 and select a filter value 706. In the present example, the SCORECARD_NAME dimension may be filtered using the filter type 704 "EQUALS" and filter value 706 "CRA2016." Thus, the data displayed on the results pane 612 may be further filtered to only display data rows that are equal to the value "CRA2016." In some examples, the filter type 704 and filter value 706 are selectable from a drop-down menus. Other method of providing filter options are also possible.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A non-transitory computer-readable medium comprising computer-executable instructions for a data exploration tool, the data exploration tool comprising:
   a data exploration interface including a query pane and a results pane, the query pane configured to receive a database query directed to a plurality of different underlying data sources, the results pane illustrating records returned from the plurality of different underlying data sources in response to the database query received from a user in the query pane;
   one or more services implemented within the data exploration tool and operable to retrieve query data in response to the database query;
   a containerized workspace created by the data exploration tool for one or more users, including the user, the containerized workspace including:
      a database administration tool instantiated within the containerized workspace; and
      an interactive development environment instantiated within the containerized workspace, the interactive development environment configured to receive and execute a plurality of analysis scripts from a code repository communicatively connected to the containerized workspace;
   a containerized temporary storage space into which the query data from the plurality of different underlying data sources is stored by the services, the containerized temporary storage space communicatively connected to the containerized workspace created by the data exploration tool to enable analysis of the records using one or more of the plurality of analysis scripts executed from the interactive development environment; and
   wherein the data exploration interface includes an analysis interface including a dimension selection panel configured to display each of the available dimensions included in the query results, each of the dimensions being selectable to be applied within a scorecard as one of (1) a data column or (2) a data filter.

2. The non-transitory computer-readable medium of claim 1, further comprising an export tool configured to export at least the database query and a definition of a scorecard generated based on the data included in the containerized temporary storage space.

3. The non-transitory computer-readable medium of claim 1, wherein the results pane includes a results tab, a metadata tab, a profile tab, and a log tab.

4. The non-transitory computer-readable medium of claim 3, wherein the metadata tab describes details regarding a time of query execution and details regarding the queried data source.

5. The non-transitory computer-readable medium of claim 1, wherein the analysis interface is configured to automatically detect each of the available dimensions included in the query results.

6. The non-transitory computer-readable medium of claim 1, wherein the analysis interface includes one or more manipulation features with which the data included in the containerized temporary storage space may be analyzed according to any of a plurality of previously-undefined dimensions.

7. A method of analyzing enterprise data, the method comprising:
   receiving a database query from a user in a query pane of a data exploration interface of a data exploration tool, the database query being a query of a plurality of different underlying data sources that is executed by one or more services implemented within a data exploration tool and operable to retrieve query data in response to the database query;
   storing, using the one or more services, records received in response to the database query in a containerized temporary storage space;
   displaying the records received in response to the database query in a results pane of the data exploration interface;
   creating, by the data exploration tool, a containerized workspace communicatively connected to the containerized temporary storage space to enable analysis of the records, wherein the containerized workspace is used by one or more users, including the user, the containerized workspace including:
      a database administration tool instantiated within the containerized workspace;
      an interactive development environment instantiated within the containerized workspace, the interactive development environment configured to receive and execute a plurality of analysis scripts from a code repository communicatively connected to the containerized workspace;
   wherein the containerized temporary storage space into which the records from the plurality of different underlying data sources is stored by the one or more services is communicatively connected to the containerized workspace created by the data exploration tool to enable analysis of the records using one or more of the plurality of analysis scripts executed from the interactive development environment and
   receiving, in an analysis interface that is included within the data exploration interface, a selection of an available dimension presented in a dimension selection panel to be included within a scorecard as one of (1) a data column or (2) a data filter.

8. The method of claim 7, further comprising exporting a definition of the database query and a selection of a plurality of dimensions to a data analytics tool.

9. The method of claim 7, further comprising automatically generating a display of each of the available dimensions reflected in the records within the analysis interface.

10. The method of claim 7, wherein the plurality of different underlying data sources comprise heterogeneous data sources within an enterprise.

11. The method of claim 7, further comprising creating an automated job performed at a predetermined time based on the database query and a selection of a plurality of available dimensions to create a scorecard.

12. The method of claim 7, wherein the containerized temporary storage space is instantiated within a cloud-based container, the method further comprising, prior to receiving the database query, instantiating the cloud-based container.

13. The method of claim 12, further comprising, after receiving the selection of the available dimension and after executing the one or more analysis script from the code repository on the records stored in the containerized temporary storage space, terminating the cloud-based container.

14. A data exploration environment comprising:
   a computing system including:
      one or more processors; and
      memory communicatively coupled to the one or more processors, the memory storing instructions for:
         a code repository; and
         a data exploration tool instantiable within a cloud-based container, the data exploration tool being communicatively linked to the code repository such that a temporary storage space within the cloud-based container is accessible to code executable from the code repository, the data exploration tool further comprising:
a data exploration interface including a query pane and a results pane, the query pane configured to receive a database query directed to a plurality of different underlying data sources, the results pane illustrating records returned from the plurality of different underlying data sources in response to the database query received from a user in the query pane, the results stored in the temporary storage space within the cloud-based container;
one or more services implemented within the data exploration tool and operable to retrieve query data in response to the database query;
a containerized workspace created by the data exploration tool and communicatively connected to the temporary storage space within the cloud-based container for one or more users, including the user, the containerized workspace including:
a database administration tool instantiated within the containerized workspace; and
an interactive development environment instantiated within the containerized workspace, the interactive development environment configured to receive and execute a plurality of analysis scripts from the code repository communicatively connected to the containerized workspace;
wherein the containerized temporary storage space into which the records from the plurality of different underlying data sources is stored by the one or more services is communicatively connected to the containerized workspace created by the data exploration tool to enable analysis of the records using one or more of the plurality of analysis scripts executed from the interactive development environment; and
wherein the data exploration interface includes an analysis interface including a dimension selection panel configured to display each of the available dimensions included in the query results, each of the dimensions being selectable to be applied within a scorecard as one of (1) a data column or (2) a data filter.

15. The data exploration environment of claim 14, wherein the code repository comprises a cloud-based code repository remotely connected to the data exploration tool.

16. The data exploration environment of claim 14, wherein the query pane is configured to receive a database query written in a structured query language.

17. The data exploration environment of claim 14, wherein the results pane illustrates records that are stored in the temporary storage space in response to the database query.

* * * * *